(No Model.) 3 Sheets—Sheet 1.
C. E. HEISS.
APPARATUS FOR CASTING PLUMBERS' TRAPS.
No. 362,624. Patented May 10, 1887.
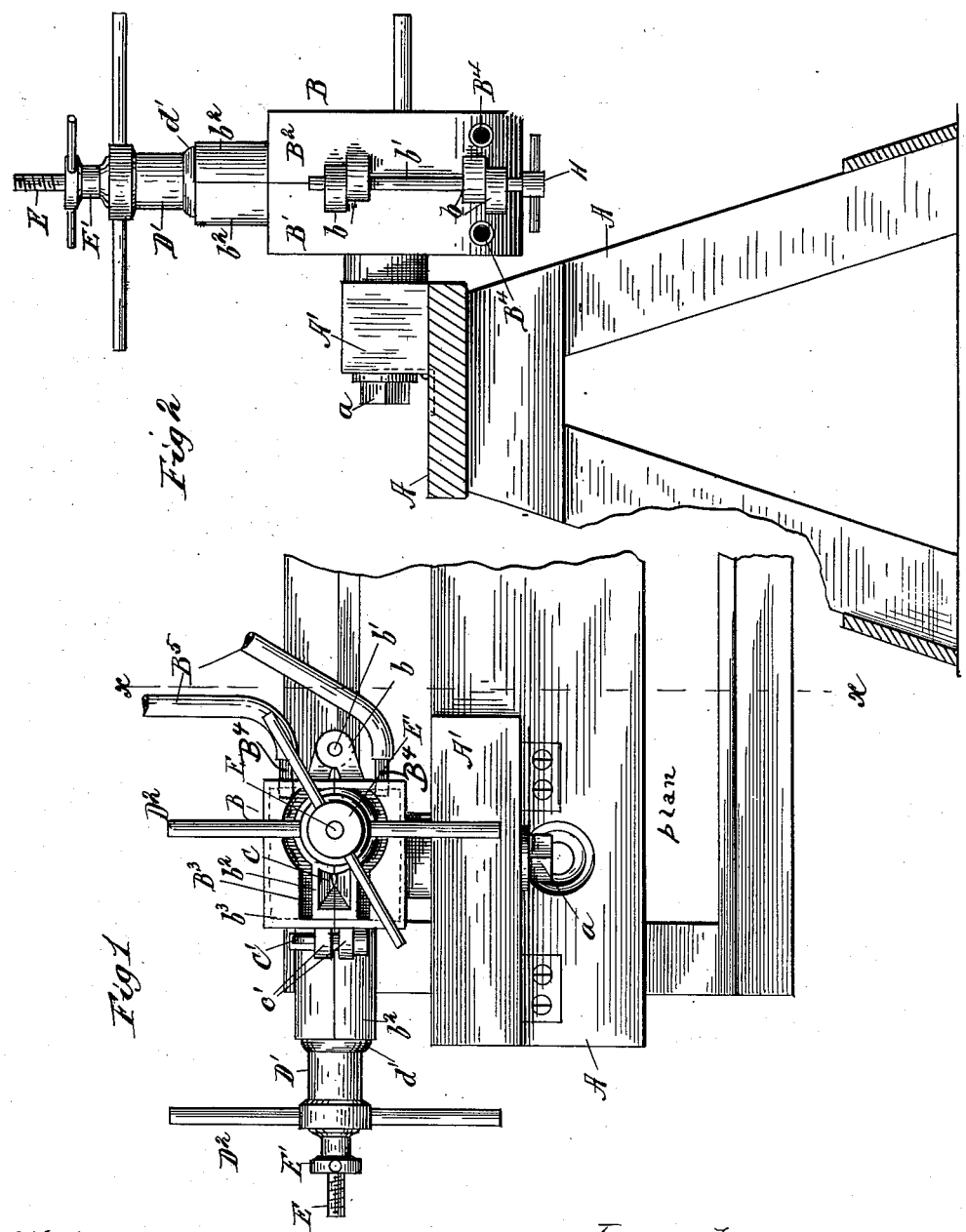
Witnesses
W. C. Corliss
Irvine Miller
Inventor
Charles E Heiss
By Coburn & Thacher
Attorneys (No Model.) 3 Sheets—Sheet 2.
C. E. HEISS.
APPARATUS FOR CASTING PLUMBERS' TRAPS.
No. 362,624. Patented May 10, 1887.
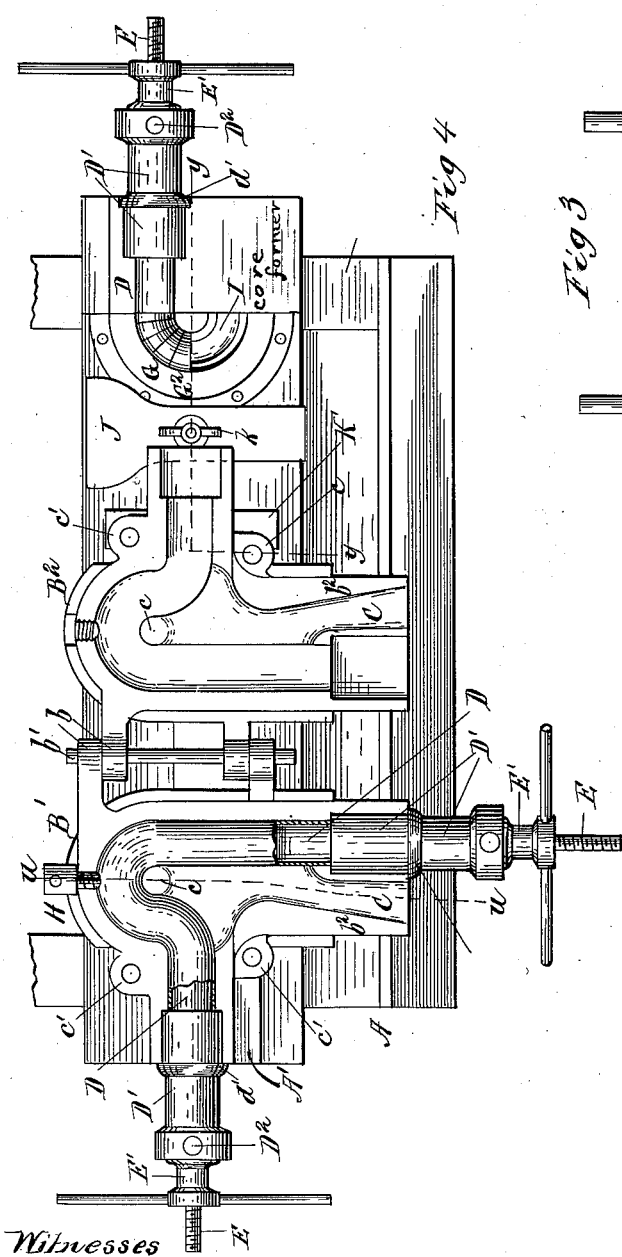
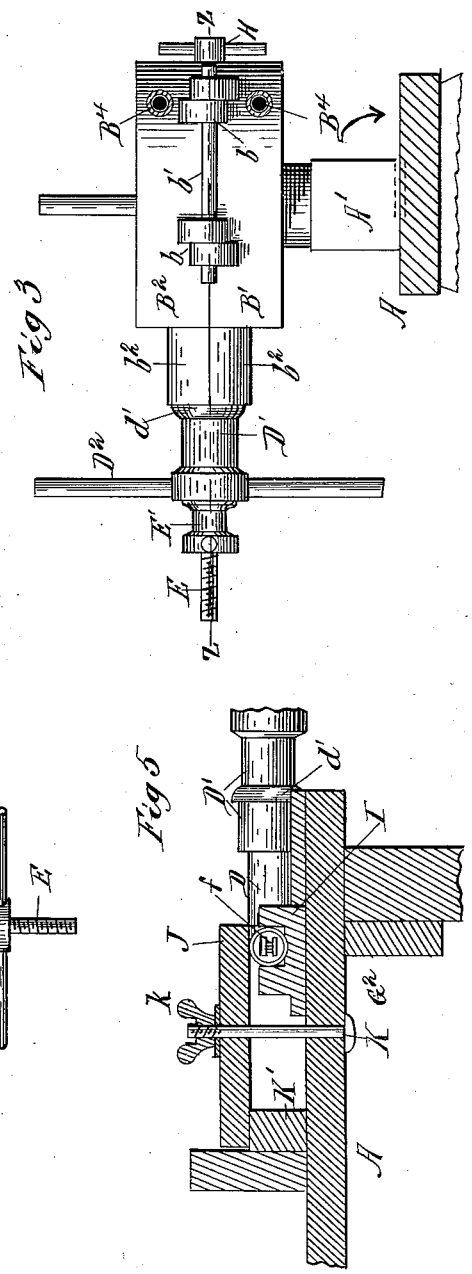
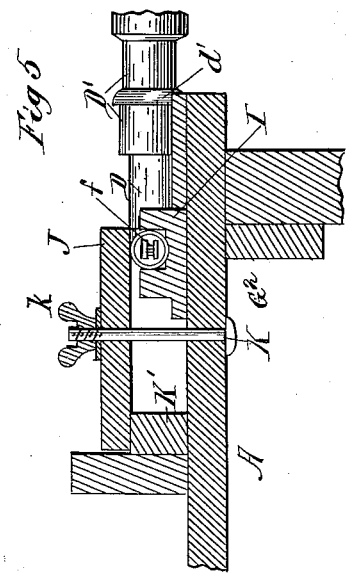
Witnesses
Inventor
Charles E. Heiss
By Cedburn & Thacher
Attorneys (No Model.) 3 Sheets—Sheet 3.
C. E. HEISS.
APPARATUS FOR CASTING PLUMBERS' TRAPS.
No. 362,624. Patented May 10, 1887.
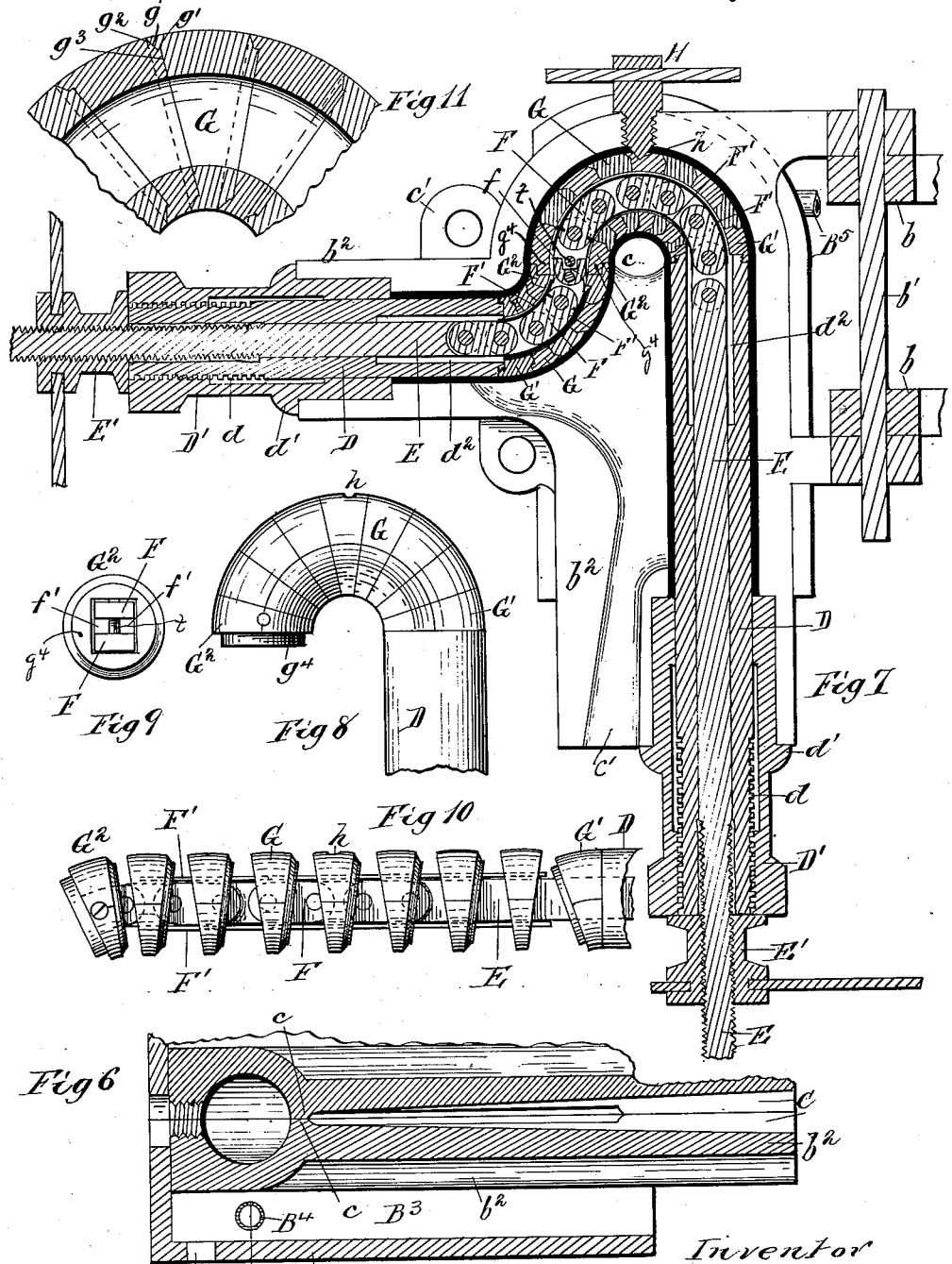
Witnesses
Inventor
Charles E Heiss
By Coburn & Thacher
Attorneys

UNITED STATES PATENT OFFICE.

CHARLES E. HEISS, OF CHICAGO, ILLINOIS, ASSIGNOR OF ONE-HALF TO JAMES N. RAYMOND, OF SAME PLACE.

APPARATUS FOR CASTING PLUMBERS' TRAPS.

SPECIFICATION forming part of Letters Patent No. 362,624, dated May 10, 1887.

Application filed January 20, 1887. Serial No. 224,939. (No model.)

*To all whom it may concern:*

Be it known that I, CHARLES E. HEISS, a citizen of the United States, and residing at Chicago, in the county of Cook and State of Illinois, have invented a certain new and useful Improvement in Apparatus for Casting Plumbers' Traps, which is fully set forth in the following specification, reference being had to the accompanying drawings, in which—

Figure 1 is a plan view of an apparatus embodying my invention, with the mold in position for casting; Fig. 2, a sectional view of the same, taken on the line $x\ x$ of Fig. 1; Fig. 3, a view similar to Fig. 2 with the mold turned into horizontal position; Fig. 4, a plan view of the apparatus with the mold open and the trap still in the same; Fig. 5, a detail sectional view taken on the line $y\ y$ of Fig. 4; Fig. 6, a detail sectional view taken on the line $u\ u$ of Fig. 3; Fig. 7, a plan section taken on the line $z\ z$ of Fig. 3; Fig. 8, a detail elevation of one of the sections of the core when contracted; Fig. 9, a detail end elevation of the same; Fig. 10, a detail elevation of the same expanded, and Fig. 11 a detail sectional view showing the construction of the segments. Figs. 1 to 5, inclusive, are on the same scale. Figs. 6 to 10 are on the same scale with respect to each other, but on an enlarged scale with respect to Figs. 1 to 5, and Fig. 11 is on a still larger scale.

Like letters refer to like parts in all the figures of the drawings.

My invention relates to apparatus for casting plumbers' traps, its object being to provide an apparatus for this purpose whereby a plumber's trap of lead may be cast in an efficient manner at a greatly reduced cost, both of time and labor; and to these ends my invention consists in certain novel features, which I will now proceed to describe, and will then particularly point out in the claims.

In the drawings, A represents a bench or table, which forms a support for the apparatus. To this bench is hinged a supporting-block, A', to which the mold is attached by means of a bolt, $a$, or any other suitable device for the purpose.

B represents the mold, which is constructed of iron or other suitable metal, and is a two-part mold, consisting of two sections or halves, B' and B², hinged together by means of perforated lugs $b$ and a suitable pintle or pivot lug, $b'$, passing through said lugs. The construction of these two sections being in all respects identical, although the arrangement is reverse, I will only describe one of them, it being of course understood that the same description is equally applicable to the other. Each mold consists of an inner portion, $b^2$, which forms the mold proper, and an outer portion, $b^3$, which forms an outer casing, a space, B³, being thus formed between the said inner and outer portions, in which is arranged a gas pipe, B⁴, provided with jet-apertures, $b^4$, arranged to direct the flames issuing therefrom against the mold proper to heat the same and prevent the metal from chilling too quickly. Gas is supplied to the pipe B⁴ by means of flexible tubing B⁵, from any suitable source, and air for combustion is supplied not only by leaving the air-space B³ open at the ends, as shown in Fig. 1 of the drawings, but also by forming suitably-disposed apertures $b^5$ in the outer casing, $b^3$, of the mold.

In the present instance I have shown a mold adapted to form what is known as a "half-S trap," in which case a semi-cylindrical groove or depression having the outline and conformation necessary to produce the exterior surface of such a trap is formed in the face of each half of the mold.

C indicates the pouring gate or inlet, which is formed one-half in each section of the mold, beginning at the upper end thereof and extending downward almost but not quite to the bend of the trap, which bend is occupied by a projection, $c$, of the solid metal of the mold. The inlet or gate C communicates with the space between the core and mold upon each side of the said projection $c$, as clearly shown in several figures of the drawings. The two sections of the mold may be secured together, when in position, by means of screw-bolts C' passing through lugs $c'$, or by any other suitable device for the purpose.

In order to provide a suitable core which may be readily withdrawn from the mold after casting, I have devised a contractible and expansible core, which when in its contracted condition is of a conformation adapted to form a suitable rigid core, but which, when expanded is flexible and may be readily withdrawn from the mold and trap. I form this core in two sections, preferably so constructed that one section forms the core for one straight arm of the trap, and also for two-thirds of its curved portion, or, in other words, a curve of one hundred and eighty degrees, while the other section forms a core for the other straight arm and for the reverse curve of ninety degrees, which forms the remainder of the curved portion of the trap. Each section of the core is constructed in the following manner:

D represents a sleeve of an external diameter equal to the desired interior diameter of the trap. This sleeve is threaded at its outer end, as shown at $d$, to receive a sleeve-nut, D', which is mounted in a suitable seat in the mold, being provided with a shoulder, $d'$, resting against the same, and with a hand-grasp or hand-wheel, $D^2$, by means of which said sleeve-nut may be rotated. Extending through the sleeve D is a tension-rod, E, capable of longitudinal motion in said sleeve, and provided on its outer threaded end with a hand-nut, E'. To the inner end of the tension-rod E is attached a chain, F, consisting of alternate double and single links, a flat metal spring, F'', of a width equal to that of the chain being attached to each side thereof, as shown more particularly in Fig. 10 of the drawings. The links of the chain F are flat, and the double links overlap the single links, so as to form a chain substantially rectangular in cross-section. These parts thus form a flexible extension of the tension-rod E, the flexibility of which, in connection with the movement of the said tension-rod, serves, in conjunction with the segments hereinafter described, to give the segmental portion of the core its proper form, in the manner hereinafter described. Upon this flexible extension is mounted a series of segments, G, which form the curved portion of the core, each segment being provided with a central aperture, rectangular in form, to fit over the chain F with its springs F', and having its faces adjacent to the other segments inclined toward each other, as shown in Figs. 8 and 10. The construction of these segments will be best understood by reference to Fig. 8, from which it will be seen that when assembled they form a curved body, circular in cross-section, the segments being divided upon lines of section drawn radially from the center of curvature, so that when assembled the several segments will form a core for the curved body of the trap. One of the segments, which I have marked G', is screwed on the end of the sleeve D, which is threaded for that purpose, while the other end segment, $G^2$, is pivoted to the last link of the chain F. Each segment is recessed upon one of its faces, said recess consisting of a bevel or inclined surface, $g$, terminating in a rabbet or shoulder, $g'$, while the adjacent face of the next segment is provided with a corresponding projection having beveled surface $g^2$ and shoulder $g^3$, to fit snugly within the said recess and prevent displacement of the parts when assembled. In order to properly connect the ends of two sections of the core, I form upon the end segment, $G^2$, of one of the sections a projection, $g^4$, which fits in a corresponding recess in the end segment, $G^2$, of the other section, and at the same time the end link of the chain of said other section is provided with projecting ears $f$, which fit in corresponding recesses, $f'$, in the first section. The ends of the two sections thus fit the one within the other and serve to mutually support each other. A core-support is preferably employed, consisting of a screw, H, extending through the body of the mold and entering a slight recess, $h$, in one of the segments G, in order to support the core more firmly in position.

In the operation of casting a trap, the first step will be the contracting of the core, so as to form a rigid body having the proper conformation. This is done, of course, while the core is entirely removed from the mold, and may be accomplished by simply screwing the nut E' down upon the tension-rod E, and thereby withdrawing the rod and a portion of the chain F attached thereto, along with its springs F'', into the sleeve D, which is recessed, as shown at $d^2$, to receive the same. The segments G are by this operation drawn together and interlocked, forming a curved body having the form shown in Fig. 8 of the drawings, being guided by the chain F and springs F', which form a body rectangular in cross-section, and thereby prevent rotation and disarrangement of the segments. The springs F' serve not only to provide a smooth surface upon which the segments may move without sticking, but also to cause the segmental portion of the core to assume a straight form when possible, thus materially aiding in the withdrawal thereof at a later stage. The segments are thus properly seated and firmly held by their adjacent recessed and beveled faces. In order to facilitate this operation of contracting the core I have devised a core-former, which I attach to one end of the bench or table A, and which consists of a grooved form, I, having a curvature conforming to the desired curvature of the core and co-operating with a pivoted turn-button, J, which, when the core is laid in position in the said grooved form, may be turned so as to rest upon the segments, as shown in Fig. 5, and by means of a thumb-nut, $k$, on its pivot-bolt K may be drawn down upon the said sections to hold them firmly in position during the operation of contracting the core. K' represents a support for the other end of the said turn-button while it is used to clamp the segments in position. By means of this device the several segments are held positively in their proper relative position during the operation of contracting the core, and after this operation is completed they will, when removed, be held firmly together in the form shown. The two core-sections are then placed in position in the mold while it is yet open, their ends being interfitted and the core-support H being placed in position, as described, and shown in Fig. 7. During this series of operations the mold has been in the position shown in Fig. 4 of the drawings, the hinged support A' being so turned that the mold rests on its side, face uppermost. The mold is then closed and locked by means of the screw-bolts C', and is then turned into an upright position, as shown in Figs. 1 and 2 of the drawings, the hinged support A' permitting this change of position in an obvious manner. The gas-jets, having been lit within the same, will heat the mold to the proper temperature to receive the melted lead, which is poured in through the gate C at the upper end of the mold, and, passing downward, fills the entire space between the mold and core. The projection $c$ at the bend of the trap prevents this bend from filling first and chilling before the remaining portions of the mold are filled, and at the same time prevents the formation of a fin at this point, where it is somewhat difficult of removal. In fact, the filling of the bend of the trap occurs almost simultaneously with the filling of both arms thereof. After the metal is set, the mold is swung back on its side, in the position shown in Fig. 3 of the drawings, the core-support H, if employed, is withdrawn, and the nut E' is screwed out to the extremity of the tension-rod E. It will be seen that by rotating the nut D' in the proper direction the sleeve D may be gradually withdrawn from the mold and trap, the several segments readily following, owing to the fact that they are no longer under tension through the medium of the tension-rod E. In fact, the segmental portion of the core is perfectly flexible when not under tension, and may be readily withdrawn through the straight portion of the trap, in which it assumes the form shown in Fig. 10 of the drawings. Each section of the core having been removed in the manner just described, the mold may be readily unlocked and opened and the complete trap removed, when the series of operations above described may be repeated indefinitely.

It is obvious that various modifications in the details of construction may be made without departing from the principle of my invention. For instance, although I have shown an apparatus adapted for the casting of what are known as "half-S traps," it is obvious that it may be readily adapted to other forms of traps. Moreover, it is also obvious that the improved core-bar hereinbefore described is adapted for use in casting any body having a curved portion from which it is necessary or desirable to withdraw the core without destroying the same, and it will be thus seen that this feature of my invention is not limited in its application to traps alone. Moreover, various modifications in the details of construction may be made, and I therefore do not wish to be understood as limiting myself strictly to the precise details hereinbefore described, and shown in the drawings.

Having thus described my invention, what I claim as new, and desire to secure by Letters Patent, is—.

1. A core for casting plumbers' traps, &c., consisting of a rigid sleeve, a curved portion composed of segments of equal diameter divided transversely upon radial lines, said segments being provided with rectangular apertures, and a tension-rod extending through the sleeve and provided with a flexible extension substantially rectangular in cross-section upon which the correspondingly-apertured segments are permanently mounted, substantially as and for the purposes specified.

2. A core for casting plumbers' traps, &c., consisting of a rigid sleeve, a curved portion composed of segments of equal diameter divided transversely upon radial lines, said segments being provided with rectangular apertures, a tension-rod extending through the sleeve, and a chain attached to the tension-rod and composed of flat links forming a flexible extension rectangular in cross-section upon which the correspondingly-apertured segments are permanently mounted, substantially as and for the purposes specified.

3. A core for casting plumbers' traps, &c., consisting of a rigid sleeve, a curved portion composed of segments of equal diameter divided upon radial lines, and a tension-rod extending through the sleeve and provided with a chain having strap-springs attached to its edges upon which these segments are mounted, substantially as and for the purposes specified.

4. The combination, with the sleeve D, the tension-rod E, having nut E', and the chain F and springs F', of the segments G, mounted loosely on said chain and springs, the segment G', secured to the sleeve, and the segment G², pivoted to the end link of the chain, substantially as and for the purposes specified.

5. The combination, with the sleeve, the tension-rod, and the chain, of the segments mounted thereon and having their adjacent faces provided with recesses having beveled wall $g$ and rabbet $g'$, and with projections having corresponding bevel, $g^2$, and shoulder $g^3$, substantially as and for the purposes specified.

6. A core for casting plumbers' traps, &c., consisting of two independent sections, each provided with a curved portion composed of segments and a chain upon which said segments are mounted, the meeting ends of said chains and the end segments being provided with interfitting projections and recesses, substantially as and for the purposes specified.

7. In an apparatus for casting plumbers' traps, &c., the combination, with the mold, of the core composed of two sections, each consisting of a sleeve, a sleeve-nut mounted on the threaded end thereof and bearing against the mold, a tension-rod mounted in said sleeve and provided with an operating-nut on the threaded end, a flexible extension attached to said tension-rod, and a series of segments mounted on said flexible extension and adapted when contracted to form the curved portion of the core, substantially as and for the purposes specified.

8. In an apparatus for casting plumbers' traps, &c., a two-part mold, each provided with the projection $c$ at the bend of the trap, and with the gate or inlet $C'$, communicating with the space between the mold and core on both sides of said projection, substantially as and for the purposes specified.

9. In an apparatus for casting plumbers' traps, &c., a mold consisting of an inner portion or mold proper, an outer portion or casing, an air-space between the two communicating with the exterior atmosphere, and means arranged in said air-space for heating the mold, substantially as and for the purposes specified.

10. In an apparatus for casting plumbers' traps, &c., a mold consisting of an inner portion or mold proper, $b^2$, an outer portion or casing, $b^3$, an open air-space, $B^3$, between the two, and pipe $B^4$, arranged in said air-space, provided with suitable jet-apertures and connected with a gas-supply, substantially as and for the purposes specified.

11. In an apparatus for casting plumbers' traps, &c., the combination, with the bench or table A, of the mold-support $A'$, hinged to the top of said table so as to rest thereon, and the two-part mold composed of two sections hinged together, one of said sections being attached to the mold-support, which is constructed and arranged to also support the other section when the mold is open, substantially as and for the purposes specified.

12. In an apparatus for casting plumbers' traps, &c., the combination, with the core provided with a segmental curved portion, of the core-former having a curved groove or recess to receive and hold the segments during the operation of forming the core, substantially as and for the purposes specified.

13. In an apparatus for casting plumbers' traps, &c., the combination, with the core provided with a segmental curved portion, of the core-former having a curved groove or recess to receive the segments during the operation of forming the core, and means for holding the segments in position within the same, substantially as and for the purposes specified.

14. In an apparatus for casting plumbers' traps, &c., the combination, with the sectional core, of the curved form I, the turn-button J, pivoted on bolt K, having nut $k$, and the support $K'$, substantially as and for the purposes specified.

CHARLES E. HEISS.

Witnesses:
IRVINE MILLER,
W. C. CORLIES.